US009858624B2

(12) United States Patent
Nagel

(10) Patent No.: US 9,858,624 B2
(45) Date of Patent: Jan. 2, 2018

(54) METHODS AND APPARATUS FOR PROVIDING DATA NORMALIZATION, SCALABILITY AND MAINTAINABILITY

(71) Applicant: QUICKDASH, LLC, Austin, TX (US)

(72) Inventor: Charles Brenton Nagel, Austin, TX (US)

(73) Assignee: Qvinci Software, LLC, Austin, TX (US)

( * ) Notice: Subject to any disclaimer, the term of this patent is extended or adjusted under 35 U.S.C. 154(b) by 687 days.

(21) Appl. No.: 14/043,731

(22) Filed: Oct. 1, 2013

(65) Prior Publication Data

US 2014/0101007 A1 Apr. 10, 2014

Related U.S. Application Data

(60) Provisional application No. 61/709,495, filed on Oct. 4, 2012.

(51) Int. Cl.
*G07B 17/00* (2006.01)
*G06F 15/16* (2006.01)
*G06Q 40/00* (2012.01)

(52) U.S. Cl.
CPC .................. *G06Q 40/12* (2013.12)

(58) Field of Classification Search
USPC ......................................................... 705/30
See application file for complete search history.

(56) References Cited

U.S. PATENT DOCUMENTS

| 5,173,853 A | * | 12/1992 | Kelly | ................. G06F 17/2205 715/235 |
| 5,392,390 A | | 2/1995 | Crozier | |
| 5,893,131 A | * | 4/1999 | Kornfeld | ........... G06F 17/30424 707/E17.005 |
| 6,141,664 A | | 10/2000 | Boothby | |
| 6,185,576 B1 | * | 2/2001 | McIntosh | .......... G06F 17/30011 |

(Continued)

OTHER PUBLICATIONS

Atkins—Need help understanding import options [Posted at GnuCash SVN/CVS and Mail Archive Server]. [retrieved on Feb. 8, 2012]. Retrieved from the Internet: < URL: http://lists.gnucash.org/pipermail/gnucash-user/2009-June/030103.html> Jun. 4, 2009 entire document.

(Continued)

*Primary Examiner* — Ashford S Hayles
(74) *Attorney, Agent, or Firm* — Gazdzinski & Associates, PC

(57) ABSTRACT

Methods and apparatus for normalizing data, such as e.g., charts of accounts, across a plurality of entities are provided. In one embodiment, a centralized web application is accessed by an administrative user. A standardized chart of accounts (SCoA) is generated or accessed within the web application. When a financial data file from a remote user is received, a chart of accounts (CoA) is generated for the received financial data file. The SCoA and CoA are displayed to the remote user. The generated CoA is normalized to the SCoA by aligning data fields between the charts of accounts and prompting the remote user to map unaligned fields. The financial data file is modified to match the SCoA based on the normalized CoA.

16 Claims, 2 Drawing Sheets

(56) References Cited

U.S. PATENT DOCUMENTS

| | | | |
|---|---|---|---|
| 6,397,232 B1 * | 5/2002 | Cheng-Hung | G06F 17/30569 707/999.01 |
| 6,411,938 B1 | 6/2002 | Gates et al. | |
| 6,477,545 B1 | 11/2002 | LaRue | |
| 6,751,663 B1 | 6/2004 | Farrell et al. | |
| 6,785,689 B1 | 8/2004 | Daniel et al. | |
| 6,850,950 B1 * | 2/2005 | Clarke | G06F 17/272 |
| 6,954,766 B2 * | 10/2005 | Ouchi | G06Q 10/06 |
| 7,120,597 B1 * | 10/2006 | Knudtzon | G06Q 40/02 705/30 |
| 7,401,101 B2 | 7/2008 | Hild et al. | |
| 7,451,103 B1 * | 11/2008 | Boyle | G06Q 20/10 705/35 |
| 7,490,108 B2 | 2/2009 | Bruun et al. | |
| 7,539,701 B2 * | 5/2009 | Sethi | G06F 17/303 |
| 7,580,884 B2 | 8/2009 | Cook | |
| 7,725,817 B2 * | 5/2010 | Krasun | G06F 17/30911 715/236 |
| 7,885,868 B2 * | 2/2011 | Nault | G06Q 40/02 705/30 |
| 8,214,329 B2 | 7/2012 | Gilder et al. | |
| 8,255,790 B2 * | 8/2012 | Francker | G06F 8/36 715/221 |
| 8,560,568 B2 | 10/2013 | Gilder et al. | |
| 8,751,464 B1 * | 6/2014 | Weiss | G06Q 10/10 707/695 |
| 9,009,098 B1 * | 4/2015 | Hushon | G06F 17/30563 707/602 |
| 9,411,864 B2 | 8/2016 | Gilder et al. | |
| 9,508,087 B1 * | 11/2016 | Liu | G06F 3/0482 |
| 2002/0052791 A1 * | 5/2002 | Defede | G06F 17/30569 705/16 |
| 2002/0052893 A1 * | 5/2002 | Grobler | G06F 17/30569 715/234 |
| 2002/0138375 A1 * | 9/2002 | Kane | G06F 17/30578 705/30 |
| 2003/0005426 A1 * | 1/2003 | Scholtens | G06F 8/67 717/169 |
| 2003/0126056 A1 * | 7/2003 | Hausman | G06Q 10/10 705/36 R |
| 2003/0163403 A1 | 8/2003 | Chen et al. | |
| 2003/0216979 A1 * | 11/2003 | Sribhibhadh | G06Q 10/06 705/30 |
| 2004/0068526 A1 * | 4/2004 | Singh | G06F 17/30569 |
| 2004/0143522 A1 * | 7/2004 | Wall | G06Q 40/02 705/34 |
| 2004/0181753 A1 * | 9/2004 | Michaelides | G06F 17/30569 715/249 |
| 2004/0199369 A1 | 10/2004 | Freidman et al. | |
| 2004/0205621 A1 * | 10/2004 | Johnson | G06F 17/211 715/235 |
| 2004/0205647 A1 * | 10/2004 | Smith | G06F 17/24 715/229 |
| 2005/0022154 A1 * | 1/2005 | Chung | G06Q 30/06 717/100 |
| 2005/0055324 A1 * | 3/2005 | Godeby | G06Q 40/12 |
| 2005/0086199 A1 | 4/2005 | Champagne et al. | |
| 2005/0144096 A1 * | 6/2005 | Caramanna, II | G06Q 40/12 705/30 |
| 2005/0154628 A1 * | 7/2005 | Eckart | G06Q 30/02 705/35 |
| 2005/0197931 A1 * | 9/2005 | Gupta | G06Q 40/00 705/30 |
| 2005/0216497 A1 * | 9/2005 | Kruse | G06Q 10/00 |
| 2005/0240467 A1 * | 10/2005 | Eckart | G06Q 40/12 705/30 |
| 2006/0004845 A1 * | 1/2006 | Kristiansen | G06F 8/38 |
| 2006/0064428 A1 | 3/2006 | Colaco et al. | |
| 2006/0193264 A1 | 8/2006 | Bonar et al. | |
| 2007/0078877 A1 * | 4/2007 | Ungar | G06F 17/2247 |
| 2007/0101437 A1 | 5/2007 | Yamamoto et al. | |
| 2007/0150385 A1 * | 6/2007 | Ode | G06Q 20/04 705/30 |
| 2007/0150806 A1 * | 6/2007 | Hartmann | G06F 17/2247 715/235 |
| 2007/0174482 A1 * | 7/2007 | Yajima | G06F 17/246 709/238 |
| 2007/0237427 A1 * | 10/2007 | Patel | G06K 9/00442 382/305 |
| 2007/0260571 A1 * | 11/2007 | Mansfield | G06F 17/227 706/48 |
| 2007/0277090 A1 * | 11/2007 | Raja | G06F 17/2211 715/212 |
| 2008/0201246 A1 * | 8/2008 | Casey | G06Q 40/12 705/30 |
| 2008/0222189 A1 | 9/2008 | Ovanesyan et al. | |
| 2008/0250157 A1 * | 10/2008 | Ohata | G06Q 10/10 709/236 |
| 2008/0306986 A1 * | 12/2008 | Doyle, Sr. | G06Q 10/10 |
| 2009/0037356 A1 * | 2/2009 | Rothstein | G06Q 30/08 706/46 |
| 2009/0150223 A1 * | 6/2009 | Sachedina | G06Q 10/06 705/7.24 |
| 2009/0187496 A1 * | 7/2009 | Edens | G06Q 10/06 705/30 |
| 2009/0201294 A1 | 8/2009 | Hayes | |
| 2009/0204517 A1 * | 8/2009 | Edens | G06Q 10/06 705/30 |
| 2009/0222470 A1 * | 9/2009 | Kemp | G06F 17/30592 |
| 2009/0234885 A1 | 9/2009 | Yotsukura | |
| 2009/0276340 A1 * | 11/2009 | Knapp | G06Q 30/04 705/30 |
| 2009/0313208 A1 | 12/2009 | Helfman | |
| 2010/0057783 A1 * | 3/2010 | Huang | G06F 17/30569 707/E17.005 |
| 2010/0107085 A1 | 4/2010 | Chadwick et al. | |
| 2010/0125616 A1 * | 5/2010 | Groth | G06Q 30/04 707/804 |
| 2010/0179940 A1 * | 7/2010 | Gilder | G06F 17/30566 707/622 |
| 2010/0205076 A1 * | 8/2010 | Parson | G06Q 40/02 705/30 |
| 2010/0318572 A1 * | 12/2010 | Ng | G06F 17/30592 707/791 |
| 2011/0173294 A1 * | 7/2011 | Jackson | G06F 17/30575 709/217 |
| 2011/0258091 A1 * | 10/2011 | Wilson | G06Q 40/02 705/30 |
| 2012/0011123 A1 * | 1/2012 | Nagel | G06Q 10/10 707/738 |
| 2012/0095873 A1 * | 4/2012 | Narang | G06Q 30/0613 705/26.41 |
| 2012/0203676 A1 * | 8/2012 | Chou | G06Q 40/02 705/30 |
| 2012/0259872 A1 * | 10/2012 | Sengupta | G06F 17/30286 707/756 |
| 2012/0265655 A1 * | 10/2012 | Stroh | G06Q 40/00 705/30 |
| 2013/0046661 A1 * | 2/2013 | Levin | G06Q 40/02 705/30 |
| 2013/0173539 A1 * | 7/2013 | Gilder | G06F 17/30578 707/622 |
| 2013/0191328 A1 * | 7/2013 | Hackmann | G06F 17/30569 707/609 |
| 2013/0232042 A1 * | 9/2013 | Simpson | G06Q 40/02 705/30 |
| 2013/0265592 A1 * | 10/2013 | Bellagamba | G06Q 30/0276 358/1.6 |
| 2013/0290837 A1 * | 10/2013 | Hudetz | G06F 17/212 715/255 |
| 2014/0006244 A1 * | 1/2014 | Crowley | G06Q 40/04 705/37 |
| 2014/0013204 A1 * | 1/2014 | Theis | G06F 17/24 715/234 |
| 2014/0101456 A1 * | 4/2014 | Meunier | G06F 17/2247 713/189 |

(56) References Cited

U.S. PATENT DOCUMENTS

2014/0136398 A1* 5/2014 Nagel .................... G06Q 40/02
705/39
2014/0250368 A1* 9/2014 Wineman .............. G06F 17/211
715/235

OTHER PUBLICATIONS

Chief Mechanic—Can I Merge 2 General Ledger Accounts? [Posted at QBGarage.com]. [retrieved on Feb. 8, 2012]. Retrieved from the Internet: <URL: http://www.qbgarage.com/blog/can-i-merge-2-general-ledger-accounts/print/> Sep. 5, 2010 entire document.
Ivens et al.—QuickBooks 2007 the Official Guide [retrieved on Feb. 8, 2012]. Retrieved from the Internet: <URL: http://books.google.com/books?id=wACFGD3clfoC&pg=PA32 &dq=sub+sub+account+quickbooks&hl=en&sa=X &ei=IM4yT9jklMuLsAK098mCBw &ved=OCEMQ6AEwAQ#v=onepage&q&f=false> 2007 (2007) ISBN-13 978-0-07-226345-9 entire document.
(IVENS) Running QuickBooks 2007 Premier Editions [retrieved on Feb. 8, 2012]. Retrieved from the Internet<URL: http://books.google.com/books?id=WbQ55tZH3JsC&pg=PA62 &dq=mapping+account+(subaccount+%7C+subaccounts)+type+name&hl=en&sa=X &ei=E50xT7uiF9KisQKyqaWIBw &ved=OCDYQ6AEwAA#v=onepage&q=mapping%20account%20(subaccount%20%7C%20subaccounts)%20type%20name &f=false> 2007 (2007) ISBN 978-1-932925-00-5 entire document.

* cited by examiner

METHODS AND APPARATUS FOR PROVIDING DATA NORMALIZATION, SCALABILITY AND MAINTAINABILITY

PRIORITY

This application claims priority to U.S. Provisional Patent Application Ser. No. 61/709,495 filed Oct. 4, 2012, entitled "Chart of Accounts Normalization, Scalability and Maintainability," which is incorporated herein by reference in its entirety. This application is also related to U.S. patent application Ser. No. 12/834,791 filed Jul. 12, 2010 entitled "System and Method for Compilation of QuickBooks Account Data" and U.S. patent application Ser. No. 12/944,702, filed Nov. 11, 2010 entitled "System and Method for Consolidating Account Data" each of which is also incorporated herein by reference in its entirety.

BACKGROUND

1. Technical Field

The present disclosure relates generally to the field of accounting and financial systems, and more particularly, in one exemplary embodiment, to providing normalization of disparate charts of accounts within a system.

2. Description of Related Technology

In order to keep track of various aspects of a business's finances and overall health, most companies use some sort of financial accounting software. Charts of accounts (CoA) are files that are used in financial accounting software and include a listing of accounts that a business uses to define each class of items for which money is either spent or received. A CoA is often locally modified by personnel in order to meet particular needs of a location. In most cases, modifying the CoA results in the software being unable to process the transmission of the financial data as the format may no longer align with what is expected by the receiving party. Because of this, business owners, and in particular franchisors needing financial data from their franchisees, have a strong desire for all of their franchisees to send and receive data in the same format. The result of properly formatted data is that the information can be processed and accurate metrics obtained. Accordingly, the franchisor will attempt to enforce the use of a standardized chart of accounts (SCoA) by their franchisees in order to facilitate the sharing of financial information among the various parties.

As the control of financial software moves from a franchisor's power to the franchisees, it is more likely that changes to the CoA will occur, causing problems with the transfer of data between the parties. One common example of financial accounting software is QuickBooks™ by Intuit, Inc. Currently, over ninety percent (90%) of all small businesses (SMB) use QuickBooks™ for their accounting system. At present, there is no known way to "lock down" a CoA in QuickBooks™ (QB), or in similar known financial accounting software products on the market today. A user with Administrative (Admin) or Ownership type permissions may enter the CoA file and add, delete, or modify the CoA at will. The ability of personnel to modify the CoA file can result in the CoA being in a constant state of flux in that the slightest change, for example a change in the name of an account, can change how all transactions in that account are reported as well as slotted. As a result, syncing QB data, financial data, or any other kind of data between various parties becomes problematic, if not impossible.

In existing implementations, a point of sale (POS) that auto-populates transactions into a financial accounting system file (such as a QB file) must have a corresponding QB file with a matching account in the CoA, in order to be able to "push" the transaction data into the correct account. Because users are able to change accounts and numbers by simply clicking the account name and appending or deleting characters, it is not uncommon for these types of changes to occur. The result of the changes frequently leads to transactions not being correctly populated during attempted transfers.

Restricting access to QB or other financial accounting software files at the franchisee level may help to minimize modifications and synchronizing failures, but experience has shown that doing so is generally not feasible for most businesses. It is often thought that a user can be denied access to their own QB file for reporting purposes, and that alternative methods will somehow provide sufficient accounting interfaces for the franchisee. However, franchisees must be able to prepare their taxes, and their CPA must have the actual QB file in order to complete preparation of the taxes. These needs alone require allowing the franchisee administrative access to the file. Additionally, franchisees may use a variety of payroll tools, some of which are provided by Intuit, Inc. from within QB, and would be necessary for the franchisee to access.

Merchant services, owner acquisitions and loans, tax audits by the IRS, and a plethora of other day-to-day operational elements are additional reasons why the franchisee must have access to the QB file.

Finally, the franchisee CoA files will typically not match the SCoA at various points during the current year or quarter for a number of reasons.

In existing systems, even one modification, such as a modification of Income accounts, may result in the POS data push failing.

In view of the challenges described above for normalizing data files using existing means, new schemes are needed for ensuring files can more easily be transferred or synched within an organization, with the least amount of manual intervention as possible. Specifically, improved methods and apparatus are needed for providing normalization of disparate chart of accounts within systems.

SUMMARY

The present disclosure satisfies the aforementioned needs by providing, inter alia, improved apparatus and methods for providing normalization of disparate chart of accounts and synching data between entities.

Firstly, a method for normalizing charts of accounts across a plurality of entities is disclosed. In one embodiment, the method includes: accessing a centralized web application by an administrative user; providing a first chart of accounts within the web application; receiving, at the centralized web application, a financial data file from a remote user; providing a second chart of accounts for the received financial data file; normalizing the generated second chart to the first chart by aligning data fields between the first and second charts of accounts, and causing mapping of unaligned fields; and modifying the received financial data file to match the first chart based on the normalized second chart.

In one variant, the aforementioned method is implemented on a computerized system using financial accounting or management software.

In another variant, the method includes displaying the generated first and second chart of accounts to the remote user.

In yet another variant, the causing mapping comprises prompting the remote user to map the unaligned fields.

A method for synchronizing financial account data between remote entities and a centralized server is also disclosed. In one embodiment, the method includes: generating financial account data; storing the financial account data in a data file according to a chart of accounts (CoA); transmitting the data file to the centralized server; receiving a modified chart of accounts from the centralized server, where the transmitted data file was determined to be inconstant with a standardized chart of accounts (SCoA); and storing newly generated financial data in a data file according to the received modified chart of accounts for future transmission to the centralized server.

In one variant, the method further includes downloading a synchronization client for transmitting the aforementioned data files to the centralized server.

In one variant, the method further includes receiving notification of a change in the SCoA and in response to receiving the notification, transmitting a data file for normalization with the changed SCoA.

A computer readable apparatus having a storage medium comprising at least one computer program is also disclosed. In one embodiment, the computer program includes a plurality of computer readable instructions which are configured to, when executed on a host device: generate a standardized chart of accounts (SCoA); receive a financial data file from a remote user; generate a chart of accounts (CoA) for the received financial data file; display the generated CoA and the SCoA; align data fields between the charts of accounts normalize the generated CoA to the SCoA; and modify the received financial data file to match the SCoA based on the normalized CoA.

In one variant, the computer readable apparatus comprises a memory within a computerized host device (e.g., PC, tablet computer, smartphone, or server blade).

In another variant, the computer readable apparatus comprises a hard drive or other mass storage device.

In another aspect, client-server architecture is disclosed. In one embodiment, the architecture is configured for synchronizing financial account data between one or more remote entities (e.g., client devices) and a centralized server. The remote entities download client software, and generate financial account data, and store the financial account data in a data file according to a chart of accounts (CoA). The data file is then transmitted using the downloaded software to the centralized server, which produces a modified chart of accounts, and transmits the modified chart to the relevant remote entity, when the transmitted data file was determined to be inconstant with a standardized chart of accounts (SCoA). Newly generated financial data is then stored in a data file according to the received modified chart of accounts for future transmission to the centralized server.

In one variant, the client and server are in communication via a data network, such as a TCP/IP based architecture.

A method for normalizing charted information across a plurality of entities is also disclosed. In one embodiment, the method includes: accessing a centralized process; generating a first chart; receiving, at the centralized process, a data file from a remote user; generating, by the process, a second chart of accounts relating to the received data file; normalizing the generated second chart to the first chart; and modifying the received data file to conform to the first chart based at least on the normalized second chart.

Other features and advantages described herein will immediately be recognized by persons of ordinary skill in the art with reference to the attached drawings and detailed description of exemplary embodiments as given below.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
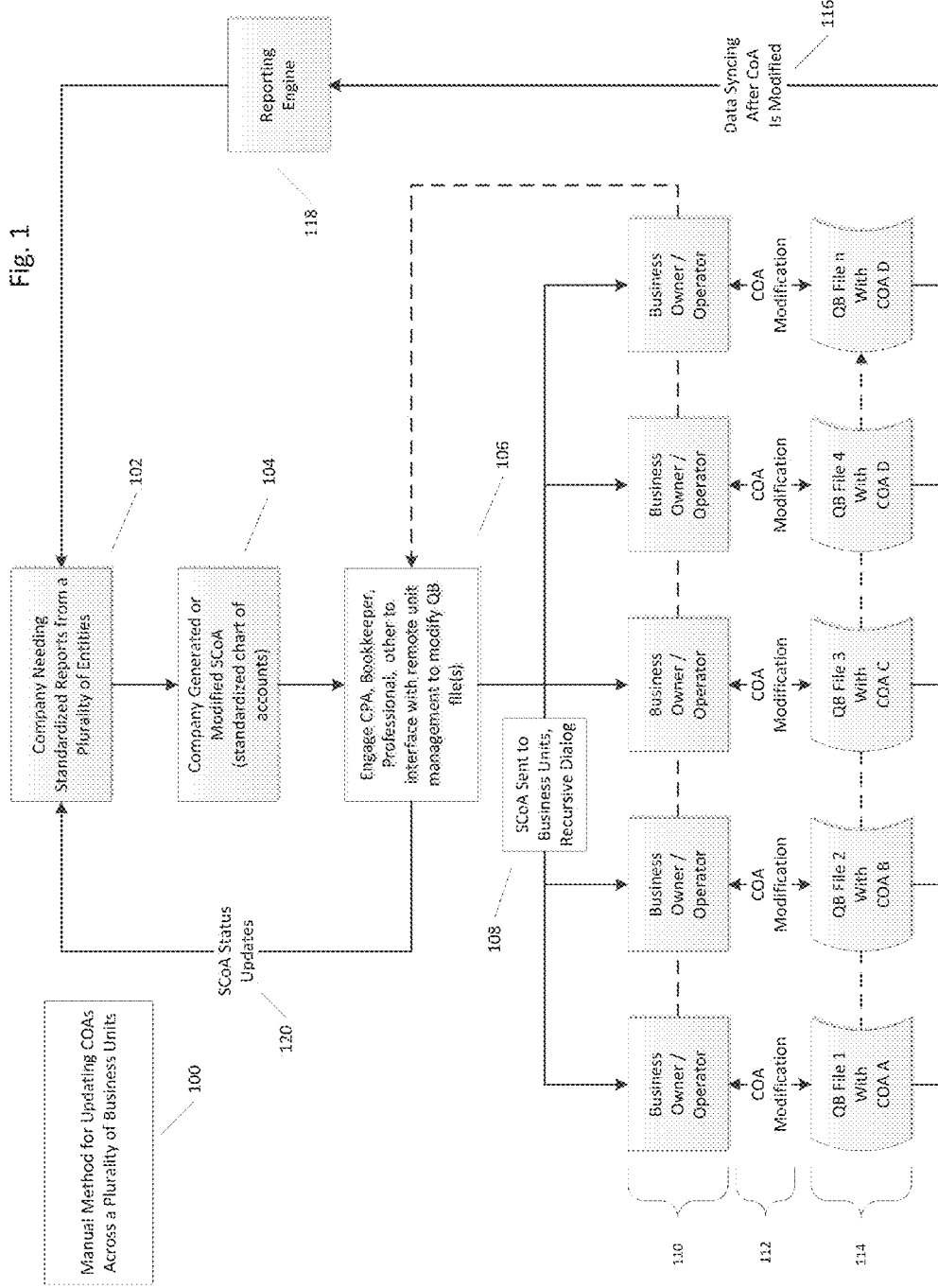
FIG. 1 is a flowchart of a manual process for updating charts of accounts across a plurality of business units.

Reference is now made to the drawings, wherein like numbers refer to like parts throughout.

Overview

The present disclosure provides, inter alia, methods and apparatus for updating charts of accounts (CoA) across a plurality of business units or other entities. In one exemplary embodiment, a method for normalizing charts of accounts across a plurality of entities is disclosed. The method includes use of a client-server architecture that enables accessing a centralized web application by e.g., an administrative user. A standardized chart of accounts (SCoA) is generated within the web application, and a financial data file is received at the application from a remote user. A chart of accounts (CoA) for the received financial data file is then generated, and the generated CoA is normalized to the SCoA, such as by aligning data fields between the charts. The software may also prompt the remote user to map any unaligned fields. The received financial data file is then modified to match the SCoA based on the normalized CoA.

The foregoing approach advantageously allows, inter alia, a franchisee or other business entity to easily adopt the SCoA and change his or her CoA, which modifies the format of their financial data file, such as a QuickBook™ (QB) file, without engaging outside personnel.

In various disclosed embodiments, the process is also scalable, in that a simple email invitation to join the process, which may be part of a standard product (such as QuickBooks™ or another financial accounting software), enrolls the franchisee in the normalization process, and activates the product.

Detailed Description Of Exemplary Embodiments

Exemplary embodiments of methods and apparatus according to the present disclosure are now described in detail. It will be appreciated that while the exemplary financial accounting software described herein may frequently refer to QuickBooks as an implementation, the disclosure provided can equally apply to any type of financial accounting software, and in fact other types of software. Thus, this disclosure is not intended to be limited to a particular application, such as QuickBooks™.

Moreover, the functionalities described herein may embodied in other media, or within other environments (such as within a larger database or other software package). Some or all of the logic described herein may also be embodied in software, firmware, or even hardware if desired, as will be appreciated by those of ordinary skill in the computer arts.

It is also appreciated that while the exemplary embodiments presented herein are described primarily in the context of financial data, the various features of the disclosure are in no way so limited, and may be applied to other contexts, including without limitation any numerical or other data which can be managed on a spreadsheet or database.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, personal computers (PCs) and minicomputers, whether desktop, laptop, or otherwise, set-top boxes, personal digital assistants (PDAs), handheld and tablet computers, cellular telephones, wireless nodes, or literally any other device capable of interchanging data with a network.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "display" refers without limitation to any visual display device including e.g., LCD, plasma, TFT, CRT, LED, incandescent, fluorescent, and other types of indicator or image display technologies.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RE wireless, millimeter wave, optical, etc.) and/or communications or networking protocols (e.g., SONET, DOCSIS, IEEE Std. 802.3, IEEE Std. 1394, ATM, X.25, Frame Relay, 3GPP, 3GPP2, LTE/LTE-A, WAP, TCP/IP, SIP, UDP, FTP, RTP/RTCP, H.323, etc.).

As used herein, the term "server" refers to any computerized component, system or entity regardless of form which is adapted to provide data, files, applications, content, or other services to one or more other devices or entities on a computer network.

Exemplary Implementations of Methods and Apparatus

As noted above, various features of the present disclosure allow, inter alia, a franchisee or other business entity to easily adopt the aforementioned SCoA, and change his or her CoA, which modifies the format of their financial data file, such as a QuickBook™ (QB) file, without engaging outside personnel. In one or more embodiments, once implemented, these features will detect anomalies or changes that the franchisee or other entity might create by remaining resident on system devices. Any change is immediately detected, and will alert the franchisee or other entity to take corrective action at that time. The corrective action, in various embodiments, is implemented by displaying the SCoA and the CoA (reflecting the change) on e.g., a user's local display device, and requesting the user to map the indicated fields between the SCoA and the CoA. The whole process takes only a few seconds, and hence provides a rapid and easy mechanism for maintaining consistency and uniformity.

In various disclosed embodiments, the process is also scalable in that a simple communication (e.g., email invitation) to join the process, which may be part of a standard product (such as QuickBooks™ or another financial accounting software), enrolls the franchisee in the normalization process, and activates the product. Therefore, the cost of requiring a professional service provider to integrate remote data files is eliminated, the time between the tasks and other workflow is highly compressed. Problems created by ongoing modifications to the CoA are rapidly identified and corrected.

One exemplary solution to the changing data file problem is provided by the Assignee of the instant application, embodied in a computer application program called Qvinci™. The methods provided by the exemplary Qvinci™ product are directed to QuickBooks™ in particular, but the methods apply equally to any financial accounting or other software. For simplicity of explanation, anytime QuickBooks™ (QB) is described, it is intended that the disclosure will also be applicable, without limitation, to other financial accounting or other software as well. Likewise, while a franchisee/franchisor relationship is also frequently discussed, the methods described herein are equally applicable to a single business with various branches, a school with different departments, non-profit organizations, and even government or military applications, or any number of other situations where data from different sources needs to be aggregated for purposes of benchmarking, providing finance statements, and the like.

In various disclosed embodiments, the solution contains a standard chart of accounts (SCoA). As users synchronize ("synch") their QB files, such as by transmitting the QB files to a central server, received data files are compared to the SCoA. The next time the user logs into its QB file locally, a software process (e.g., Qvinci synch applet) is displayed on their screen and acts as a normalizer for the CoAs. The synch applet in the exemplary implementation shows the user's chart of accounts (CoA) alongside the SCoA. The user matches his or her CoA accounts to the SCoA accounts in the user interface (UI). Once mapped, the user clicks a "submit" button, and the normalizer changes the CoA of the QB file so that it is now in the form of the franchisor's SCoA. Once completed, (often less than 2 or 3 minutes), reports, such as a profit and loss (P&L) report, for example, can easily be generated. In various disclosed embodiments, the synch applet remains in a persistent state, so that any time a change occurs to the CoA, the synch applet displays and directs the user through the process of mapping the change in the CoA to align with the SCoA.

In various disclosed embodiments, when a modification to the SCoA occurs, such as adding a sub-account to an existing account or any number of other changes, all remote users (e.g., franchisees) will automatically have the changes displayed as described above, and can easily modify their existing QB CoA to match the new SCoA. It will be appreciated that, in cases of large scale, such as where a business has thousands of franchisees, the ability to roll out a change to the SCoA instantly to every remote user is in itself a tremendous savings of time, effort, and money, and hence underscores a salient advantage of the present disclosure.

In various disclosed embodiments, as franchisees are added, the synch application self-installs and runs for those new franchisees, such as on initial install of the client application, via an update, or other mechanism. In other embodiments, a franchisee may initiate the download of the synch application, install, and run in order to synch their data. In other variants, if a user makes a change to the CoA, as described above, and does not remedy the situation by initiating a data synch within a prescribed criterion; e.g., relatively short period of time (for situations where a synch does not automatically occur upon the change being detected), the franchisor or other supervisory entity will receive an automatic alert as to for instance the franchisee's name, location, the new account name, and/or other parameters. The alert may be in the form of a text message, e-mail message, "tweet", automated phone call, or any number of other similar communications.

The exemplary embodiment of the inventive normalizer solution facilitates the objective of changing thousands of individual financial accounting data files, such as QB files, to match the franchisor's SCoA. The process is automated to the highest degree possible, and dramatically helps to keep the QB files aligned. The solution is far less costly and far more accurate than manual methods, and the time and effort to deploy changes or updates is insignificant by comparison. Franchisees or other remote users do not have to be convinced to abandon their QB files, and the franchisor obtains a highly scalable business process with very minimal effort.

FIG. 1 is a flowchart of a prior art manual process 100 for updating charts of accounts across a plurality of business units. As described previously, methods for manually modifying charts of accounts and other related files can be costly and time intensive. For example, modifying a CoA a single time to match an SCoA usually means engaging a certified public accountant (CPA), bookkeeper, or other specialist. At Step 102 of the method 100, a company determines the need to create standardized reports from a plurality of entities. Standardized reports may be related to Profits and Loss, inventory, pay roll, sales, tax data, and any number of other types of reports. The entities may be franchisees, departments, schools, locations, or any number of entities that report data upstream.

In an exemplary manual method, at Step 104, a company or franchisor generates or modifies a standard chart of accounts (SCoA). At Step 106, a CPA, bookkeeper, or other professional must interface with a remote unit's management or management's designee to modify their QB files to match the SCoA. At Step 108, the SCoA is transmitted to business units or franchisees to begin a dialog in which the end result is (hopefully) a modified CoA file in compliance with the SCoA. This professional must engage the franchisee, asking them to provide a cross-comparison of their QB CoA to the SCoA, often in the form of a spreadsheet such as an Excel file.

At Step 110, the business owner or operator of the franchise, only when they are ready to do so, makes an attempt at the cross-comparison and returns the Excel document to the CPA or other professional. This step often takes time and virtually "hounding" the franchisee to finish the comparison. The CPA then reviews the supplied cross-comparison document. Often the process will take one to two additional discussions with the franchisee to finalize the mapping. At this point the franchisee must grant the CPA or other professional administrative access to the QB file. This access is often reluctantly granted and may take several forms or levels of approval before being granted.

At Step 112, modification to the CoA of the QB or other data file occurs. If the QB file is not hosted remotely, at Step 114, the franchisee must send the file to the CPA or other professional and cannot perform any transactions during the time it takes for the modifications to be performed. The CPA makes the changes, usually requiring several hours of work, and returns the file to the franchisee. If the data file is hosted remotely, the CPA obtains login access and at Step 112 makes the changes to the QB file in the same timeframe. This manual process must be repeated for each QB file in the network.

Once the CoA has been updated at Step 112 and QB files modified at Step 114, data is now able to be synced and sent to the reporting engine at Step 116. Only after the CoA at each location has been updated and synced into the reporting engine 118, the user may then view resultant reports across one, many, or all QB locations as shown in Step 102.

At Step 120, any time there is an update to the SCoA status, the entire manual process must begin again, in order to ensure that the CoAs of data files that will be reporting data are in compliance with the updated SCoA.

Any time a franchisee modifies their CoA, the manual engagement process restarts to account for the modification. Additionally, when performed manually, the process only occurs if someone has visibility to see that a change has happened and initiates the mapping.

CPAs typically spend, on average, three hours to make the necessary modifications, but often will spend a minimum of a calendar week to get through the engagement process, per QB file. This is due to various factors such as franchisee availability issues, login problems, and other logistical dysfunction. Prices usually range from $300-$450 per QB file for a single, one time through-the-loop, effort. In many cases, incremental costs are applied to clean up other ongoing issues as they arise. This manually intensive workflow is diametrically opposed to the objective of scalability, and hinders the rollout of many units.

Figure 2:
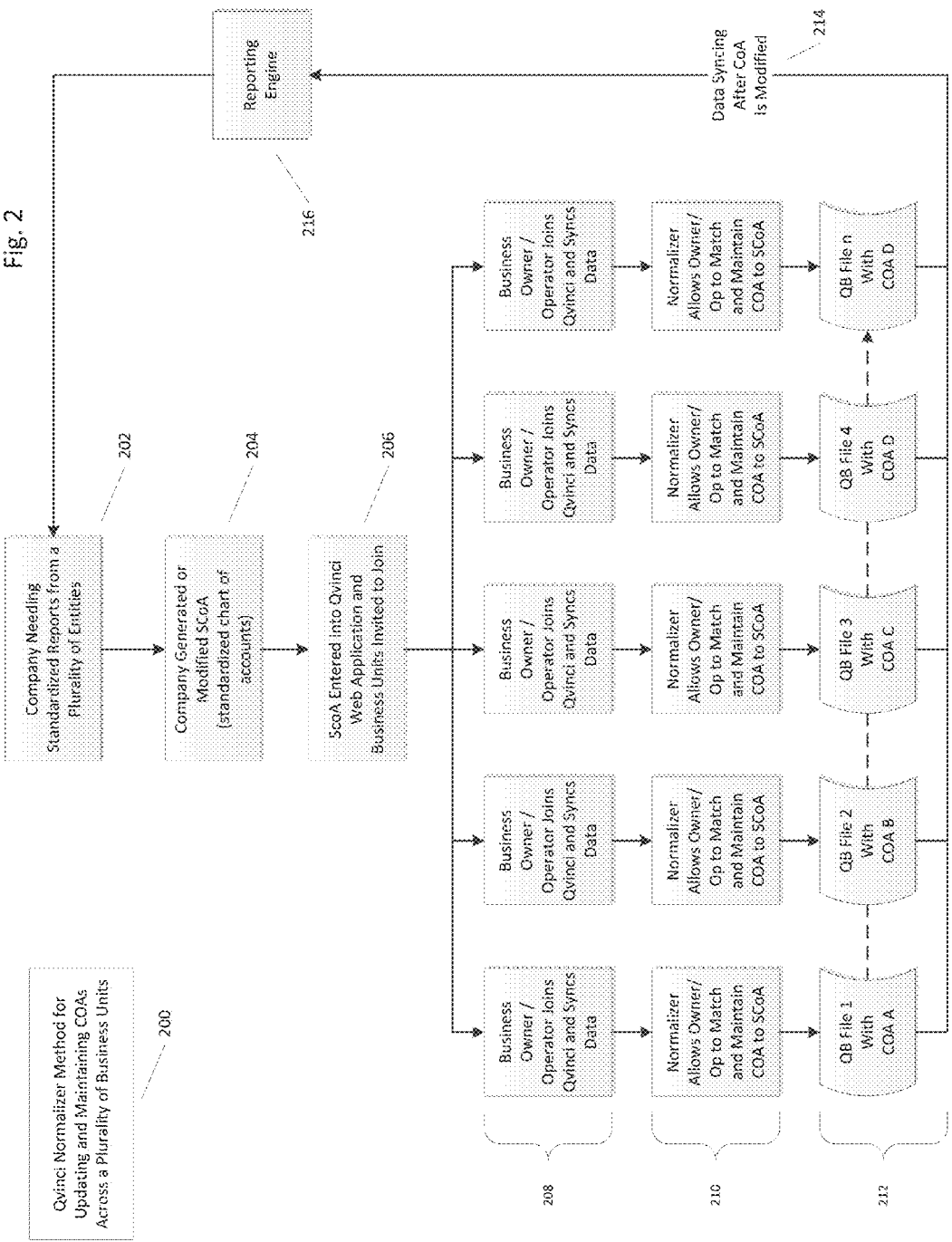
FIG. 2 is a flowchart of an exemplary process for a normalizer method for updating charts of accounts across a plurality of business units.

FIG. 2 is a flowchart of an exemplary embodiment of a normalizer method for updating charts of accounts (CoAs) across a plurality of business units or franchisees, according to the present disclosure. Similar to FIG. 1, at Step 202, a company determines the need to create standardized reports from a plurality of entities. Standardized reports may be related to Profits and Loss, inventory, pay roll, sales, tax data, and any number of other types of reports. The entities may be e.g., franchisees, departments, schools, locations, or any number of entities that report data upstream, such as financial, accounting, or any other data.

In an exemplary method using a normalizer, at Step 204, a company or franchisor generates or modifies a standard chart of accounts (SCoA). At Step 206, the SCoA is entered into a web application, such as a Qvinci.web application, which allows for standardized reports to be generated. The Admin creates one or more locations for each financial file and invites users who "own" or provide data for the financial files to join the web account.

At Step 208, a business owner or operator joins the web account in order to synch their data. The web account may be accessed remotely over the Internet or other network, such as a LAN, and provides a centralized server or portal to aggregate data from anywhere information is collected when the data is needed by the business or other entity for standardized reports.

At Step 210, a normalizer (such as a synch client of the type previously described herein) is used, which allows the owner or operator to match CoAs to the SCoA. Essentially, a user links and syncs their financial file(s) to the Admin's web account that is relevant for the user's location. In one or more disclosed embodiments, the synch client, such as the Qvinci Sync Client (QSC), is an application or applet that facilitates transmitting remote financial files to a main web account, such as the Qvinci.web reporting application. In various disclosed embodiments, the sync client is downloaded by a remote user and installed on one or more remote computers, servers, or other devices running the accounting application. In another variant, the sync client is automatically downloaded when a user joins the web account, rather than being manually downloaded.

The web application, such as the Qvinci.web application, uses its "account mapping" service operating through a user web form to display the SCoA and the user's CoA of their financial file(s). During account mapping, fields within the SCoA and CoA that do not align or are otherwise inconsistent may be highlighted or listed; this makes clear for the user which of the fields need to be mapped. The user or administrator then maps the CoA to align with the SCoA. In other words, a data field that a person would recognize as pertaining to the same thing but has a different name in the CoA than it does in the SCoA will get "mapped" or assigned to the related field during account mapping. Using account mapping, when the CoA for a data file changes, the data file itself changes to match the CoA and becomes fully compatible with the SCoA.

At Step 212, upon completion of the mapping by the user or Admin, the web application, such as Qvinci.web, instructs the sync client, such as the QSC, to modify the CoA inside the remote financial file to match the SCoA such that the chart of accounts for the remote file now aligns with the SCoA in the web account.

At Step 214, data can now be synched using the updated data file having the CoA which now matches or is compatible with the SCoA file. In situations where the SCoA is modified, a similar process is used where the synch client facilitates mapping from the new SCoA to the CoA of remote files that transmit data for synchronization.

The exemplary solution contains a variety of utilities to notify the user and/or administrator of exceptions, such as in the event that the CoA in the remote financial file is changed is some manner, on an on-going basis, which does not align with the SCOA. In Step 216. in various disclosed embodiments, a reporting engine (e.g., algorithm or routine) is used to monitor changes or exceptions in the file and facilitates their continual alignment.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the disclosure, which is limited only by the following claims.

What is claimed is:

1. A method for normalizing financial data information across a plurality of entities, the method comprising:
   receiving, at a centralized process, a standardized chart of accounts (SCoA) from a first user, the SCoA having a first format;
   receiving, at the centralized process, a financial data file from a second user having a second format, the second format differing from the first format, the first user differing from the second user;
   generating, by the centralized process, a chart of accounts (CoA) for the received financial data file;
   simultaneously causing, by the centralized process, the display of portions of the generated CoA and portions of the SCoA to the second user;
   aligning, by the centralized process, data fields between the generated CoA and the SCoA;
   prompting the second user to map unaligned fields between the generated CoA and the SCoA in order to normalize the generated CoA to the SCoA;
   modifying the received financial data file to match the SCoA based on received inputs from the second user to map the unaligned fields;
   subsequent to modifying the received financial data file, receiving an updated financial data file from the second user, the updated financial data file comprising one or more updated fields within the financial data file; and
   automatically modifying the received updated financial data file to conform with the SCoA having the first format based at least in part on received inputs from the second user to map the unaligned fields.

2. The method of claim 1, wherein the method further comprises transmitting the modified received financial data file for subsequent use by the second user.

3. The method of claim 1, wherein the method further comprises synchronizing the updated financial data file with the modified received financial data file.

4. The method of claim 3, wherein the updated financial data file is compatible with a financial accounting software application.

5. The method of claim 1, wherein the centralized process comprises a web application, and the method further comprises inviting the second user to access the web application for synchronizing data files between the second user and data files managed by the web application.

6. The method of claim 1, wherein the centralized process comprises a web site accessible upon registration and authentication by the remote user.

7. The method of claim 1, further comprising:
   responsive to a change occurring in the SCoA, transmitting a notification of the change to one or more remote entities.

8. A non-transitory computer readable apparatus having a storage medium comprising a computer program, the computer program comprising a plurality of computer readable instructions which are configured to, when executed on a computing device:
   receive a standardized chart of accounts (SCoA) from a first user, the SCoA having a first format;
   receive a financial data file from a second user, the financial data file having a second format, the second format differing from the first format, the first user differing from the second user;
   generate a chart of accounts (CoA) for the received financial data file;
   simultaneously cause display of portions of the generated CoA and portions of the SCoA to the second user;
   align data fields between the generated CoA and the SCoA;
   prompt the second user to map unaligned fields between the generated CoA and the SCoA in order to normalize the generated CoA to the SCoA;
   modify the received financial data file to match the SCoA based on received inputs from the second user to map the unaligned fields;
   subsequent to the modification of the received financial data file, receive an updated financial data file from the second user, the updated financial data file comprising one or more updated fields within the financial data file; and modify the received updated financial data file automatically so that it conforms with the SCoA having the first format based at least in part on received inputs from the second user to map the unaligned fields.

9. The computer readable apparatus of claim 8, wherein the plurality of computer readable instructions are further configured to transmit the normalized CoA to the second user for subsequent use by the second user.

10. The computer readable apparatus of claim 8, wherein the plurality of computer readable instructions are further configured to:

notify remote users upon a change occurring in the SCoA; and subsequent to the notification of remote users of the change in the SCoA, receive a second financial data file from a remote user and align data fields between the received second financial data file and the SCoA.

11. The computer readable apparatus of claim 8, wherein the computing device is a web server accessible to remote users for synchronizing financial data, and the plurality of computer readable instructions are further configured to synchronize financial data received from the remote users to the received SCoA from the first user.

12. The computer readable apparatus of claim 8, wherein the alignment of data fields between the generated CoA and the SCoA occurs automatically via use of an account mapping service.

13. The computer readable apparatus of claim 8, wherein subsequent to the modification of the received financial data file to match the SCoA based on the received inputs from the second user to map the unaligned fields, generate a plurality of reports for the modified received financial data file.

14. The computer readable apparatus of claim 13, wherein the plurality of reports comprises two or more of a profits and loss report, an inventory report, a pay roll report, and a sales report.

15. The computer readable apparatus of claim 8, wherein access to the computer program is permitted through a web site that is accessible upon registration and authentication by a remote user.

16. The computer readable apparatus of claim 8, wherein responsive to a change occurring in the SCoA, transmit a notification of the change to one or more remote entities.

* * * * *